United States Patent Office 3,213,428
Patented Oct. 19, 1965

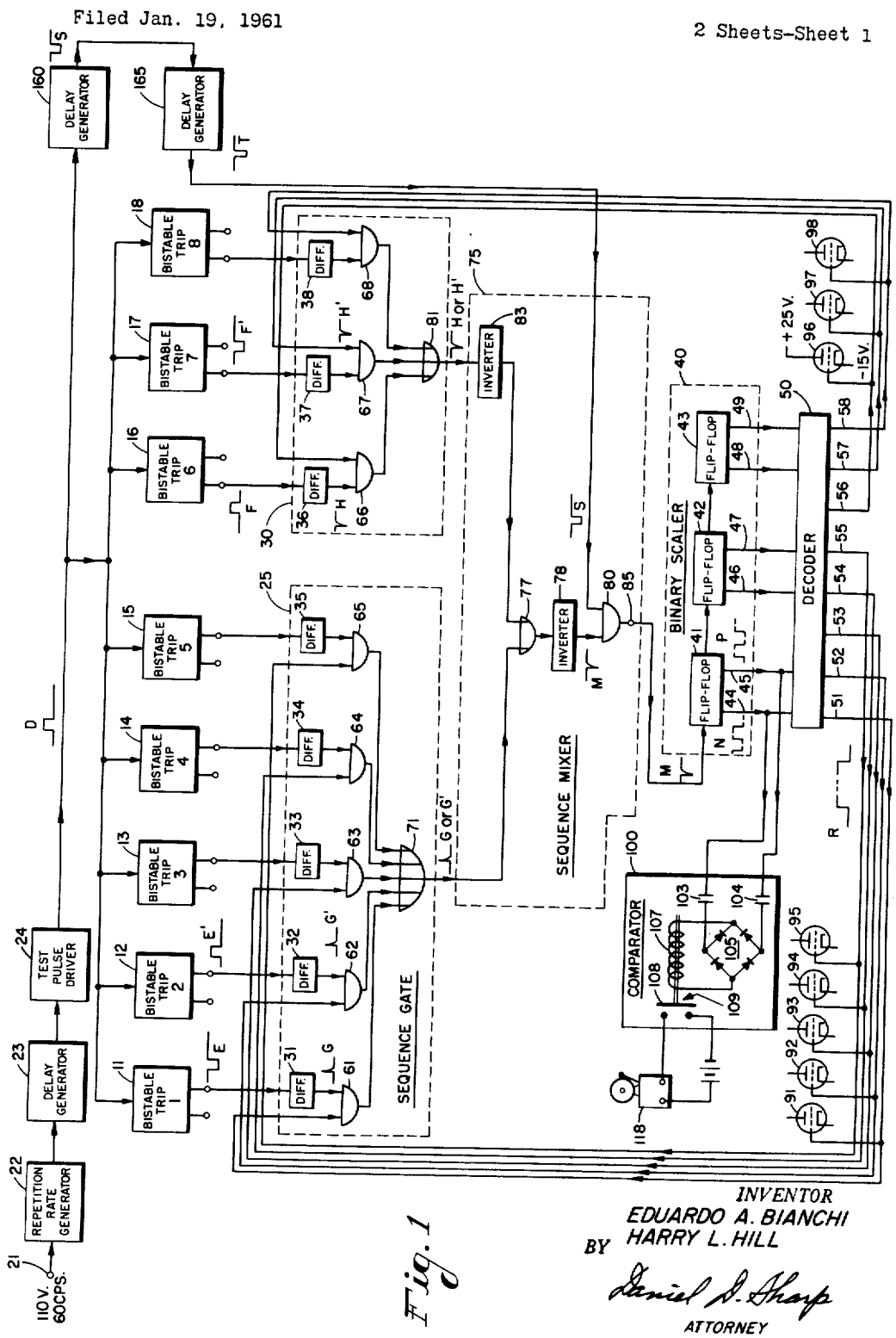

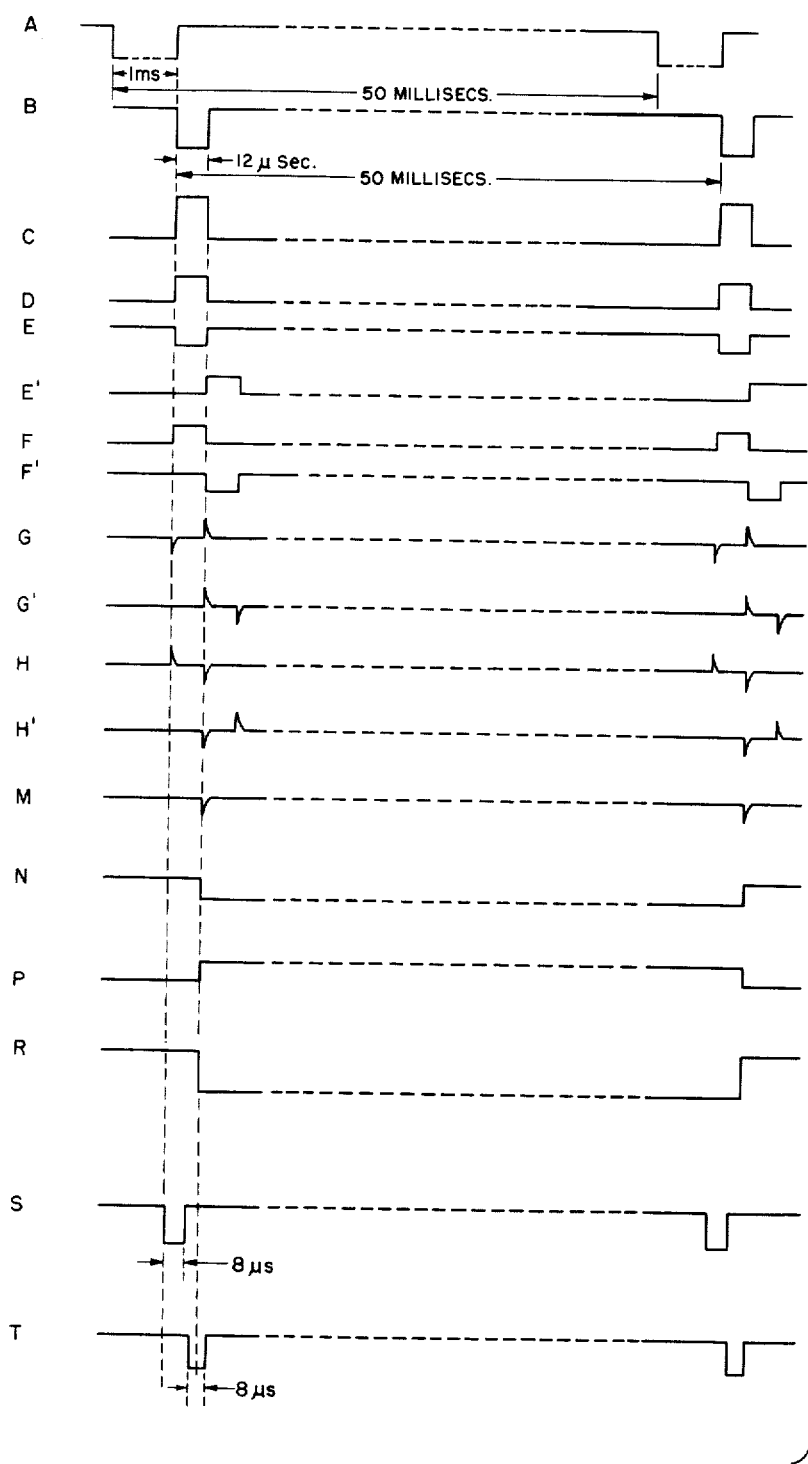

3,213,428
SEQUENTIAL TESTING SYSTEM
Eduardo A. Bianchi and Harry L. Hill, Rochester, N.Y., assignors to General Dynamics Corporation, Rochester, N.Y., a corporation of Delaware
Filed Jan. 19, 1961, Ser. No. 99,974
4 Claims. (Cl. 340—172.5)

This invention relates to a system for self-testing one or more bistable devices and, more particularly, to a system for automatically testing in sequential fashion for proper dynamic switching action of a group of bistable devices and for indicating malfunction of one or more of said bistable devices.

Bistable trip circuits are useful in various instrumentation and control channels in performing a wide variety of control and indicating functions. For example, a bistable trip circuit may be tripped from one state to another in response to analog signals representative of a certain type of information. It is possible that these bistable trip circuits may fail in either of its two states, or that the device may go into self-oscillation.

An object of this invention is to provide means for continuously testing a group of such bistable trip circuits in a manner which will provide an operator with a positive indication, either of improper operation or failure of operation, of any of these bistable devices.

The bistable devices are stimulated simultaneously by low duty cycle test pulses of short duration. If a given bistable device is operating properly, it will respond to the test pulse by making an excursion to the opposite state for a short period of time which may be made equal to the duration of the test pulse. The output of each bistable device is examined sequentially by a multistage sequence controlling means. If the output pulse from a particular bistable device is in the correct position and is of the proper amplitude and polarity, a trigger signal is delivered to the sequence controlling means; the latter then is stepped on to examine the next bistable device. In the absence of any malfunction in the bistable devices, each bistable device will be tested in sequence. This sequence is repeated cyclically until such time as a malfunction occurs in one of these bistable devices. A plurality of visual indicating elements may be provided within the sequence controlling means—one for each bistable device—for providing the operator with a visual display of the sequence in operation. If all bistable devices are functioning properly, the visual indicating elements will be activated sequentially. If, however, a particular bistable device becomes incapable of switching properly, the associated visual indicator element will remain activated. Further sequential activation of the various indicator elements then ceases until the faulty operation of that bistable device is corrected. Detection of a faulty bistable device also can be provided by means of an annunciator inserted in the sequence controlling means which responds to the absence of dynamic variations existing within the sequence controlling means during normal operation of all bistable devices.

For a better understanding of the invention, together with further objects thereof, reference is made to the following description, taken together with the accompanying drawings wherein:

FIG. 1 is a block diagram of a self-testing system according to the invention; and FIG. 2 represents waveforms illustrative of the operation of the device of FIG. 1.

Referring to FIG. 1, a system is shown for self-testing a plurality of bistable trip circuits 11–18. Although eight bistable trip circuits are shown in FIG. 1, by way of example, it should be understood that any number of bistable devices may be tested in accordance with the principles of the invention. Each of the bistable trip circuits 11–18 has two outputs. One of these outputs may be referred to as a $U_{01}$ output, indicating that the output voltage normally is at one level when untripped but at a more negative level when tripped. The other output may be referred to as a $U_{10}$ output characterized by a more positive level when tripped than when untripped. For example, the $U_{01}$ output might be at +10 volts when untripped and at zero volt when tripped, whereas the $U_{10}$ output might be at zero volt when untripped and at +10 volts when tripped. The $U_{01}$ and $U_{10}$ output waveforms are shown in FIGS. 2E and 2F, respectively. In FIG. 1, five bistable trip circuits 11–15 of the $U_{01}$ type and three bistable trip circuits 16–18 of the $U_{10}$ type are illustrated; however, any combination of $U_{01}$ and $U_{10}$ type bistable trip circuits may be used, depending upon overall system requirements.

The function of each of the bistable trip circuits 11–18 is to receive analog input information which trips the corresponding bistable trip circuit from one state to the other when the input level exceeds a preset trip point. Since this analog input information is independent of the self-testing arrangement according to the invention, these inputs to the bistable trip circuits are shown in FIG. 1. The analog information supplied to the bistable trip circuits is of much lower frequencies than the short test pulses used for self-testing for proper operation of the bistable trip circuits; consequently, the presence of this analog information does not affect the self-testing system about to be described.

An alternating current supply voltage, which may be from a 60 cycle per second, 110 volt supply, is applied to input terminal 21. This input supply voltage is applied to a repetition rate generator 22 which may be an asymmetrical multivibrator synchronized with every $n$th peak of the alternating current supply voltage. In the application shown, the repetition rate generator is synchronized with every 3rd peak of the alternating current supply voltage; the pulse repetition frequency, therefore, is 20 cycles per second, corresponding to a period of 50 milliseconds. The duration of the negative pulse A derived from the repetition rate generator 22 will depend, in part, upon the time constant of the charging circuit in the repetition rate generator and, in the example shown, is about one millisecond.

The output of the repetition rate generator 22 is supplied to a delay generator 23 which is a monostable multivibrator triggered from the trailing edge of the output waveform A. The delay generator 23 produces two identical waveforms B and C of opposite polarity which are applied to the test pulse driver 24. These complementary outputs from delay generator 23 are of short duration, for example, 12 microseconds. The test pulse driver 24 is an impedance matching device which may consist of an emitter-follower and a collector-follower connected in series with an output lead common to both. The positive pulse B from the delay generator 23 is coupled to the base of the emitter-follower and an output pulse is obtained having a sharp leading edge. The negative pulse C from the delay generator may be coupled to the base of the collector-follower whereby an output pulse may be obtained from the trailing edge. These pulses are then combined in the common output lead of the test driver to form a positive test pulse D which has sharp leading and trailing edges. The duration of these test pulses D is the same as that of pulses B and C.

Each test pulse D is applied simultaneously to all of the bistable trip circuits 11–18. Bistable trip circuits 11–15 are connected as $U_{01}$ devices. Each positive test pulse D will switch these five bistable devices; negative pulses E or positive pulses E' will then appear at the $U_{01}$ output of each of these devices, depending upon the condition of the particular bistable device existing at the time of arival of the test pulse. Similarly, bistable trip circuits 16–18 are connected as $U_{10}$ devices; input test pulses D applied thereto will cause pulses F or F' to appear at the $U_{10}$ outputs of these devices. The negative pulses from bistable trip circuits 11–15 are applied to a sequence gate 25 which includes a group of differentiating circuits 31–35 for differentiating the respective bistable trip circuit output pulses E. The differentiated bistable trip circuit pulses are shown in FIG. 2G. Similarly, the positive pulses from bistable trip circuits 16–18 are applied to a sequence gate 30 which includes differentiating circuits 36–38 productive of differentiated pulses, as shown in FIG. 2H. All of the differentiated pulses G and H have a leading edge coincident with the trailing edge of the test pulse D. The pulses G and H are of opposite polarity, however.

Prior to continuing with the description of the sequence gates 25 and 30, a description of the binary scaler 40 is in order. The binary scaler 40 includes a sufficient number of flip-flops 41, 42 and 43 to provide a binary count equal to the number of bistable trip circuits to be tested. In the example shown in FIG. 1, since eight bistable trip circuits are involved, three cascaded flip-flops will suffice for the binary scaler 40. If sixteen bistable trip circuits were to be tested, a four-stage binary scaler would be required. When a count of other than $2^n$ is required, where $n$ is any positive integer, feedback between flip-flops in the binary scaler can be resorted to in order to inhibit some of the counts ordinarily provided. These principles are well known in the art and need not be described in detail. At any given time, each of the binary scaler flip-flops 41–43 will be in some particular state so that the voltage on the output lines 46–49 of the binary scaler 40 will present a singular pattern of relatively high and low voltages.

A decoder 50 is used to convert the binary information at the binary scaler 40 which is in the form of output voltages on output lines 44–49 of the binary scaler 40 to a single digital voltage on one only of the decoder output lines 51–58. The decoder 50 operates in accordance with well known principles and may consist, for example, of a diode matrix which delivers a positive output signal R when all the diodes connected between output lines 44–49 of the binary scaler and a particular decoder output line are back biased. In one case, the voltage on the decoder output lines is normally at −25 volts; the lines reach a level of zero volt when activated by the binary scaler. Each decoder output line is associated with a particular bistable trip circuit. For example, decoder output line 51 is associated with bistable trip circuit 11, decoder output line 52 is associated with bistable trip circuit 12, etc. The pulse R on an active decoder output line is 50 milliseconds and its edges are coincident with the test pulse D.

It will be assumed, for purposes of explanation, that, at the instant the system is placed in operation, the binary scaler is at a count such that an output pulse R appears on decoder output line 55. This positive output pulse is supplied to an AND gate 65 in the sequence gate 25; gate 65 further receives the differentiated output pulse G from bistable trip circuit 15. At this instant, only one decoder output line is active (at the more positive of two levels) and the AND gate 65 is the only one of the AND gates 61–68 which is on. During coincidence of the decoder pulse R from output line 55 and the differentiated output pulse G from bistable trip circuit 15, pulse G passes through the AND gate 65 and the OR gate 71 in sequence gate 25 and also through an OR gate 77 in sequence mixer 75. Since the binary scaler 40 is adapted to trigger to the next state in response to negative pulses, the positive pulses passing through the OR gate 77 in sequence mixer 75 are inverted by means of inverter 78 to form a negative spike M which is supplied to the output terminal 85 of sequence mixer 75 through an AND gate 80. The pulse M is coupled to the input circuit of the binary scaler 40 whenever AND gate 80 in the sequence mixer is on. For the time being, it will be assumed that this AND gate 80 is on. The function of AND gate 80 will be explained subsequently.

The negative spike M triggers the binary scaler 40 to the next stable binary state, whereupon an output pulse R appears on the next decoder output line, namely, output line 56. The output pulse R on line 56 of decoder 50 is applied to AND gate 66 in sequence gate 30. During the test period, the differentiated output pulse H from bistable trip circuit 16 is coincident with the output pulse R on decoder output line 56. The AND gate 66 in sequence gate 30 is now on and passes the negative pulse H; pulse H also passes through the OR gate 81 in sequence gate 30. Inasmuch as the pulses H from sequence gate 30 are negative while the pulses G from sequence gate 25 are positive, and since the OR gate 77 in sequence mixer 75 must be supplied with two inputs of the same polarity, the output pulses H from sequence gate 30 are inverted by inverter 83 in the sequence mixer 75 prior to application to the OR gate 77. Inverted pulse M from inverter 78 is coupled to the binary scaler 40, provided that the AND gate 80 is on, as already assumed. Pulse M then steps the binary scaler 40 to the next state, whereupon an output pulse R appears on decoder output line 57. This output pulse proceeds to switch on the AND gate 67 in sequence gate 30 to which the differentiated output pulse H from bistable trip circuit 17 is applied. This differentiated output pulse H then is responsible for setting the binary scaler 40 to a state such that decoder output line 58 is activated. It is now obvious that each of the bistable trip circuits 11–18 are tested in sequence and, so long as normal operation of all bistable trip circuits continues, the sequence of testing repeats at a rate determined by the pulse repetition rate of the repetition rate generator 22.

Visual indicator devices 91–98 are connected, respectively, to decoder output line 51–58. There is, thus, one visual indicator device for each of the bistable trip circuits 11–18. These indicating devices may be grid controlled filamentary anode vacuum tubes having the grid connected to the corresponding decoder output line. The anode is coated with a luminescent material. As each decoder output line is activated, that is, when its voltage rises from −25 volt to zero volt, in the example given, the corresponding indicator tube draws current and causes a visible glow on the anode. Each indicator tube normally is cut off when the decoder output level is inactivated but becomes conductive when the corresponding decoder output line voltage rises. Proper operation of the bistable trip circuits 11–18 is indicated by sequential flashes of the indicator tubes 91–98 in the respective decoder output line. The duration of a flashing cycle will depend upon the pulse repetition rate of the test pulses D. This rate, in turn, will depend upon the pulse repetition rate of the pulses A derived from the repetition rate generator. Normally, the repetition rate generator is set so that the sequence of illumination of the indicating devices will be just slow enough to be easily visible to the eye. As soon as malfunction of one of the bistable trip circuits occurs, however, no output pulse from that bistable trip circuit is capable of passing through the associated AND gate in the sequence gate. Consequently, no pulse is available to step the binary scaler 40 to its next condition. This causes the indicator tube corresponding to the defective bistable trip circuit to remain illuminated and prevents further sequential illumination of the indicator tubes.

It is also advisable to provide audible means of annunciating failure in the bistable trip circuits. This can be accomplished by applying the two outputs of the least significant flip-flop 41 of the binary scaler 40 to a comparator 100. Each of the two output lines 44 and 45 of flip-flop 41 is connected by way of relatively large capacitors 103 and 104, respectively, to input terminals of a conventional diode bridge network 105. The coil 107 of a relay 109 is connected across the output terminals of the bridge network. The contact 108 of relay 109 is open when the relay coil is energized. When the coil is deenergized, however, contact 108 closes, whereupon a bell 118 sounds an alarm. During normal operation of the bistable trip circiuts, the two outputs of the flip-flop 41 in binary scaler 40 are essentially square waves N and P of opposite polarity. The comparator 100 couples both A.C. signals from the two outputs of the flip-flop 41 which swings about the same voltage. Rectification of these two signals occurs in bridge rectifier 105 and a direct current flows in relay 107, causing relay contact 108 to remain open. In the event of malfunction of any one of the binary trip circuits 11–18, that is to say, if the binary scaler 40 should not receive a "proceed to test" signal from sequence mixer 75, the two outputs N and P of flip-flop 41 will remain at a steady voltage level, one of which is higher than the other. These direct current voltages will not pass through capacitors 103 and 104 to the bridge circuit input terminals. Consequently, coil 107 of relay 109 is deenergized, relay contact 108 closes and bell 118 is actuated to sound an alarm.

It is possible, of course, to couple the comparator 100 to any of the flip-flops in the binary scaler 40, since the outputs from any flip-flop therein would be complementary; however, better relay response is insured if the more rapidly varying outputs from the first flip-flop 41 are fed to the comparator. It is also possible to couple the pulse M at the output terminal 85 of the sequence mixer to a one-shot multivibrator and to supply the output of this multivibrator to the comparator. However, since we have a flip-flop built into the binary scaler, it is convenient to energize the comparator directly from one of the flip-flops therein.

Although a binary counter 40 and decoder 50 are shown in FIG. 1, it should be understood that the invention does not require the use of a binary counter and decoder. Devices capable of translating signals in a time domain into signals in a position domain may be used. Examples of such devices are ring counters, shift registers, or even electromechanical devices such as a stepping switch. For example, a conventional ring counter may serve the same function as the combination of binary scaler and decoder. One of the disadvantages of such a ring counter, however, is that it requires a number of flip-flops equal to the number of bistable trip circuits to be tested. In one application of this invention, forty bistable trip circuits must be tested. If a ring counter were used, forty flip-flops with eighty vacuum tubes or transistors would be needed. A binary scaler having only six flip-flops will suffice for this application. By using the binary scaler and decoder, forty bistable trip circuits would require only twelve vacuum tubes or transistors in the counting stages, as compared with eighty vacuum tubes or transistors in the case of the ring counter. The economy and reliability of the binary scaler and decoder combination is now obvious. The diode matrix is a relatively simple and inexpensive device which can be modified rather easily to suit system requirements. The savings in tubes or transistors more than offset the increased cost of a diode matrix.

In the previous discussion, it has been assumed that the output waveform M in the sequence mixer 75 was capable of passing through an AND gate to trigger the binary scaler 40. The purpose of introducing the AND gate 80 in sequence mixer 75 is to minimize transmission to the binary scaler 40 of spurious pulses which may be generated within the equipment of which the bistable trip circuit self-testing system of the invention is but a part. In the absence of the AND gate 80 in the sequence mixer 75, a spurious pulse could trip the binary scaler to the next condition. This spurious pulse might be the leading or trailing edge of an output from a self-oscillating bistable trip circuit. Such spurious operation can be reduced to a minimum by means of the AND gate 80 and a gating pulse T applied thereto.

The manner of deriving this gating pulse T will now be described. The output pulse D from the test pulse driver 24, in addition to being applied periodically to all bistable trip circuits 11–18, also is supplied to a delay generator 160 which may be a monostable multivibrator triggered from the leading edge of test pulse D. The delay generator 160 provides a negative pulse S which, in the application shown herein, is of 8 microseconds duration. Another delay generator 165 is triggered by the trailing edge of the pulse S from delay generator 160 and generates the gating pulse T which is to be supplied to AND gate 80 in sequence mixer 75. As shown in FIG. 2, delay generator 160 serves to establish the position of the leading edge of gating pulse T, while the delay generator 165 establishes the gating pulse width. The delay set into the two delay generators 160 and 165 is such that the trailing edge of test pulse D substantially bisects the gating pulse T; that is, the inverted pulse M is located approximately in the middle of gating pulse T to insure positive gating of the differentiated test pulse to the binary scaler.

It is now evident that the differentiated and inverted test pulse M will operate upon the counting means 42 only when a gating pulse T is available at AND gate 80 of the sequence mixer 75. Since gating pulse T is extremely narrow, there can be no spurious operation of the binary scaler or ring counter except in the extremely rare case of a sharp pulse edge occurring during the 8 microseconds gating period. The possibility of such a random occurrence is unlikely. Even if such a possibility existed, its recurrence during the next cycle of test pulses within that same 8 microsecond gating period would be practically impossible. The sequential testing would then resume in the normal manner 50 milliseconds later.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. In a system for testing a group of devices, means for stimulating simultaneously said devices at periodic intervals to produce output pulses from each of those of said devices which function properly, counting means having as many count conditions as there are said devices, said counting means including a plurality of output lines each corresponding to one distinct count condition and arranged in the same sequence as said devices, said counting means providing an output signal only on that one of said output lines corresponding to the count condition then existing, individual gating means for each device, each gating means being enabled during the presence of an output signal from a corresponding one of said output lines to permit transfer of available output pulses from the corresponding bistable device to said counting means, said counting means being transferred to a succeeding count condition during said transfer of output pulses for producing an output signal on the succeeding output line, a multiplicity of visual indicating elements each responsive to a different one of said output signals for providing a sequential display when all of said devices are operating in the desired manner and a stationary indication only from that one of said elements associated with the bistable device first determined to be operating improperly.

2. In a system for testing a group of bistable devices, means for stimulating simultaneously said bistable devices at periodic intervals to produce output pulses from each of those of said bistable devices which function properly, counting means having as many count conditions as there are bistable devices, said counting means including a plurality of output lines each corresponding to one distinct count condition and arranged in the same sequence as said bistable devices, said counting means providing an output signal only on that one of said output lines corresponding to the count condition then existing, individual gating means for each bistable device, each gating means being enabled during the presence of an output signal from a corresponding one of said output lines to permit transfer of available output pulses from the corresponding bistable device to said counting means, said counting means being transferred to a succeeding count condition during said transfer of output pulses for producing an output signal on the succeeding output line, a multiplicity of visual indicating elements each responsive to a different one of said output signals for providing a sequential display when all of said bistable devices are operating in the desired manner and a stationary indication only from that one of said elements associated with the bistable device first determined to be operating improperly, and annunciating means energized during the absence of sequential operation of said counting means for providing an alarm indicative of improper operation of one of said bistable devices.

3. In a system for testing a group of bistable devices, means for stimulating simultaneously said bistable devices at periodic intervals to produce output pulses from each of those of said bistable devices which function properly, counting means having as many count conditions as there are bistable devices, said counting means including a plurality of output lines each corresponding to one distinct count condition and arranged in the same sequence as said bistable devices, said counting means providing an ouput signal only on that one of said ouput lines corresponding to the count condition then existing, means including a gating circuit opened for a short duration in response to operation of said means for stimulating, individual gating means for each bistable device, each gating means being enabled during the presence of an output signal from a corresponding one of said output lines to permit transfer of available output pulses from the corresponding bistable device through said opened gating circuit to said counting means, said counting means being transferred to a succeeding count condition during said transfer of output pulses for producing an output signal on the suceeding output line, and a multiplicity of visual indicating elements each responsive to a different one of said output signals for providing a sequential display when all of said bistable devices are operating in the desired manner and a stationary indication only from that one of said elements associated with the bistable device first determined to be operating improperly.

4. In a system for testing a group of bistable devices, means for stimulating simultaneously said bistable devices at periodic intervals to produce output pulses from each of those of said bistable devices which function properly, counting means having as many count conditions as there are bistable devices, said counting means including a plurality of output lines each corresponding to one distinct count condition and arranged in the same sequence as said bistable devices, said counting means providing an output signal only on that one of said output lines corresponding to the count condition then existing, means including a gating circuit opened for a short duration in response to operation of said means for stimulating, individual gating means for each bistable device, each gating means being enabled during the presence of an output signal from a corresponding one of said output lines to permit transfer of available output pulses from the corresponding bistable device through said opened gating circuit to said counting means, said counting means being transferred to a succeeding count condition during said transfer of output pulses for producing an output signal on the succeeding output line, a multiplicity of visual indicating elements each responsive to a different one of said output signals for providing a sequential display when all of said bistable devices are operating in the desired manner and a stationary indication only from that one of said elements associated with the bistable device first determined to be operating improperly, and annunciating means energized during the absence of sequential operation of said counting means for providing an alarm indicative of improper operation of one or more of said bistable devices.

References Cited by the Examiner

UNITED STATES PATENTS

| | | | |
|---|---|---|---|
| 2,597,428 | 5/52 | Bachelet | 340—146.1 X |
| 2,623,108 | 12/52 | Holden | 340—253 |
| 2,642,527 | 6/53 | Kelley. | |
| 2,762,014 | 9/56 | Anderson | 340—213 |
| 2,800,645 | 7/57 | Koch | 340—213 |
| 2,899,675 | 8/59 | Clement | 340—248 |

ROBERT C. BAILEY, *Primary Examiner.*

BENNETT G. MILLER, MALCOLM A. MORRISON,
*Examiners.*